(12) United States Patent
Setina et al.

(10) Patent No.: US 11,104,296 B2
(45) Date of Patent: Aug. 31, 2021

(54) SEAT BELT SYSTEM FOR VEHICLE WITH ELECTRICALLY-ACTUATED MODE-CHANGING RETRACTOR

(71) Applicant: J.R. Setina Manufacturing Co., Olympia, WA (US)

(72) Inventors: Terry L. Setina, Olympia, WA (US); Adam Sampson, Tenino, WA (US)

(73) Assignee: J.R. Setina Manufacturing Co., Olympia, WA (US)

( * ) Notice: Subject to any disclaimer, the term of this patent is extended or adjusted under 35 U.S.C. 154(b) by 0 days.

(21) Appl. No.: 16/908,086

(22) Filed: Jun. 22, 2020

(65) Prior Publication Data
US 2020/0331430 A1    Oct. 22, 2020

Related U.S. Application Data

(63) Continuation of application No. 15/494,308, filed on Apr. 21, 2017, now Pat. No. 10,688,960.

(51) Int. Cl.
| | |
|---|---|
| *B60R 22/48* | (2006.01) |
| *B60R 22/343* | (2006.01) |
| *B60R 22/02* | (2006.01) |
| *B60R 22/24* | (2006.01) |
| *B60R 22/00* | (2006.01) |
| *B60R 22/18* | (2006.01) |

(52) U.S. Cl.
CPC ............ *B60R 22/48* (2013.01); *B60R 22/023* (2013.01); *B60R 22/24* (2013.01); *B60R 22/343* (2013.01); *B60R 2022/003* (2013.01); *B60R 2022/1806* (2013.01); *B60R 2022/4883* (2013.01)

(58) Field of Classification Search
CPC ....... B60R 22/18; B60R 22/34; B60R 22/343; B60R 22/48; B60R 2022/003; B60R 2022/4816; B60R 2022/485; B60R 2022/4866; B60R 21/12
See application file for complete search history.

(56) References Cited

U.S. PATENT DOCUMENTS

| | | |
|---|---|---|
| 4,811,912 A | 3/1989 | Takada |
| 5,755,235 A | 5/1998 | Magiawala et al. |
| 5,970,587 A | 10/1999 | Knox |
| 5,992,884 A | 11/1999 | Gillespie et al. |
| 6,215,395 B1 | 4/2001 | Slaughter et al. |

(Continued)

*Primary Examiner* — Barry Gooden, Jr.
(74) *Attorney, Agent, or Firm* — Klarquist Sparkman, LLP (57) ABSTRACT

A seat belt system for a vehicle comprises a first seat belt buckle mounted at a first location, a second seat belt buckle mounted at a second location and a seat belt retractor mounted at a third location, a seat belt and a circuit. The third location is spaced along a seat for an occupant from the second location. The seat belt is extendable from the seat belt retractor and has a tongue. The seat belt is extendable to connect the tongue to the first seat belt buckle or the second seat belt buckle. The circuit interconnects the first seat belt buckle, the second seat belt buckle and the seat belt retractor. The circuit is configured to change an operating mode of the seat belt retractor when (1) the seat belt tongue is removed from the first seat belt buckle and/or (2) the seat belt tongue is removed from the second seat belt buckle. An optional indicator can be provided to indicate to the vehicle operator that the operating mode of the retractor has been changed.

16 Claims, 6 Drawing Sheets

(56) References Cited

U.S. PATENT DOCUMENTS

| | | |
|---|---|---|
| 6,655,718 B2 | 12/2003 | Eusebi |
| 6,819,233 B2 | 11/2004 | Beaty |
| 6,924,742 B2 | 8/2005 | Mesina |
| 7,137,649 B2 | 11/2006 | Eusebi |
| 7,731,237 B2 | 6/2010 | Eusebi |
| 9,555,769 B2 | 1/2017 | Lanter |
| 2003/0038717 A1 | 2/2003 | Beaty |
| 2003/0042724 A1 | 3/2003 | Eusebi |
| 2004/0108707 A1 | 6/2004 | Eusebi |
| 2007/0063505 A1 | 3/2007 | Eusebi |
| 2009/0102271 A1 | 4/2009 | Squires et al. |
| 2009/0201141 A1 | 8/2009 | Teshome et al. |
| 2014/0223703 A1 | 8/2014 | Ammons |
| 2015/0121973 A1 | 5/2015 | Travers et al. |
| 2016/0159317 A1* | 6/2016 | Jung .................. B60R 22/1955 297/472 |
| 2016/0318431 A1 | 11/2016 | Gardner |
| 2017/0072903 A1 | 3/2017 | Farshchi et al. |
| 2018/0304853 A1 | 10/2018 | Setina et al. |
| 2019/0344741 A1* | 11/2019 | Korona .................. B60N 2/002 |

\* cited by examiner

SEAT BELT SYSTEM FOR VEHICLE WITH ELECTRICALLY-ACTUATED MODE-CHANGING RETRACTOR

CROSS REFERENCE TO RELATED APPLICATION

This application is a continuation of U.S. patent application Ser. No. 15/494,308, filed Apr. 21, 2017, which is hereby incorporated by reference.

BACKGROUND

Law enforcement officers and other similar vehicle operators face risks when they are transporting detainees or prisoners. Such detainees are often transported while they are handcuffed with their hands behind their back, but escapes from the vehicle and altercations with officers still occur. Some vehicles include a partition that physically separates the rear of the vehicle where handcuffed prisoners are seated from a front area where one or more officers are seated.

Increasingly, law enforcement vehicles are using seat belts to secure detainees when they are transported, both for the additional security they provide to the officer as well as to protect the detainees in the event of a collision. But securing a conventionally-configured seat belt around a seated detainee is difficult to accomplish safely. According to one approach, the seat belt is suspended away from the seat so the detainee can be guided into a seated position on the seat and below the seat belt, and the officer then finishes securing the seat belt without needing to reach across the detainee.

Incidents of handcuffed and seat-belted detainees that have escaped from vehicles or had altercations with officers are still reported. Thus, there is still a need to improve measures for securing detainees in vehicles that ensures their safety during transport, but decreases their chances of escaping from the vehicle or injuring officers or others.

SUMMARY

Described below are embodiments of a seat belt system with an electrically-actuated mode changing retractor that address drawbacks in conventional approaches.

According to one implementation, a seat belt system for a vehicle comprises a first seat belt buckle mounted at a first location, a second seat belt buckle mounted at a second location and a seat belt retractor mounted at a third location. The third location is spaced along a seat for an occupant from the second location. A seat belt is extendable from the retractor and has a tongue. The seat belt is extendable to connect the tongue to the first seat belt buckle or the second seat belt buckle. A circuit interconnects the first seat belt buckle, the second seat belt buckle and the seat belt retractor. The circuit is configured to change an operating mode of the seat belt retractor when at least one of (1) the seat belt tongue is removed from the first seat belt buckle or (2) the seat belt tongue is removed from the second seat belt buckle.

The circuit can comprise an indicator operable to signal a vehicle operator if at least one of (1) the seat belt tongue is removed from the first seat belt buckle or (2) the seat belt tongue is removed from the second seat belt buckle. The indicator comprises a visual indicator and/or an audio indicator.

The system can be configured for a passenger seat, and the first seat belt buckle can be configured for positioning at a level above and spaced forwardly of the passenger seat. The second seat belt buckle can be configured for positioning adjacent a first side of the passenger seat. The retractor is configured for positioning at a level above the seat and rearward of the seat.

The first seat belt buckle can be connected to a partition positioned to separate a rear seat area from a front seat area in the vehicle, and the passenger seat can comprise a rear passenger seat space of a rear seat.

The second seat belt buckle can be positioned adjacent an outer side of the rear passenger seat space and the seat belt retractor can be positioned at an inner side of the rear passenger seat space.

The circuit can comprise at least one relay connected to the first seat belt buckle, and the first seat belt buckle can comprise a switch. The relay can be operative to cause the retractor to change operating modes when the switch in the first buckle changes states.

The circuit can comprise at least one relay connected to the second seat belt buckle, and the second seat belt buckle can comprises a switch. The relay can be operative to cause the retractor to change operating modes when the switch in the second buckle changes states.

The circuit can comprise a relay connected to the first seat belt buckle and to the second seat belt buckle. The relay can comprise a normally closed relay.

The first seat belt buckle can comprise a first switch, and the second seat belt buckle can comprise a second switch. The relay can be operative to cause the retractor to change operating modes when the first switch changes states or when the second switch changes states.

The first switch and the second switch can be configured to be in an open state when the tongue is removed from the first seat belt buckle or the second seat belt buckle, respectively, thereby de-energizing the relay and causing a solenoid in the retractor to be energized and change the retractor to a free-spooling mode.

The first switch or the second switch can be configured to be in a closed position when the tongue is inserted in the first seat belt buckle or the second seat belt buckle, respectively, thereby energizing the relay and causing power to a solenoid in the retractor to be terminated and the retractor to change to a locking mode.

The tongue can define an end of the seat belt, or the tongue can be configured to slide along the seat belt.

The first switch and the second switch can be connected to the relay in parallel to each other.

The system can comprise at least one illumination element connected to the relay and configured to be illuminated when the relay is deenergized by opening the first switch or opening the second switch. The at least one illumination element can be one or more LED elements.

In the system, a switch in the first seat belt buckle can change states upon removing the tongue from the first seat belt buckle, thereby electrically triggering the retractor to change from a locking mode to a free spooling mode to allow the seat belt to be extended from the retractor as the tongue is repositioned from the first seat belt buckle to the second seat belt buckle. A switch in the second buckle can change states when the tongue is inserted into the second buckle, thereby electrically triggering the retractor to change from the free spooling mode to the locking mode to prevent the seat belt from being further extended from the retractor.

The switch in the second buckle can change states when the tongue is removed from the second buckle, thereby electrically triggering the retractor to change from the locking mode to the free spooling mode.

According to a method implementation, securing a detainee in a vehicle with a seat belt comprises positioning a tongue of the seat belt in a first seat belt buckle spaced above and forwardly of a rear seat of the vehicle such that the seat belt extends from the first buckle towards a retractor located adjacent the rear seat on an inboard side of a rear seat space, positioning the detainee in the rear seat space of the rear seat, removing the tongue from the first buckle, thereby changing the retractor from a locking mode to a free spooling mode, moving the tongue and the seat belt so that the tongue is proximate a second buckle positioned adjacent the rear seat space, thereby causing the seat belt to contact and wrap around the detainee, and inserting the tongue into the second buckle, thereby changing the retractor from the free spooling mode to the locking mode.

The changing of the retractor between a locking mode and a free spooling mode can be configured to occur electrically upon changing a state of a switch in the first buckle or in the second buckle. The method can also include initiating an audio or visual indication to a vehicle operator that the retractor has changed from a locking mode to a free spooling mode. The audio or visual indication can comprise different indications to differentiate between at least the changing of state of the first switch and of the second switch.

An electrically-actuated seat belt retractor comprises a seat belt retracting mechanism and an electrically-actuated solenoid capable of being energized to change an operating mode of the seat belt retractor between a first locking mode and a second free spooling mode.

DETAILED DESCRIPTION

Described below are implementations a seat belt system using multiple buckle locations in which the seat belt retractor can be caused to change modes, such as electrically.

Figure 1A:
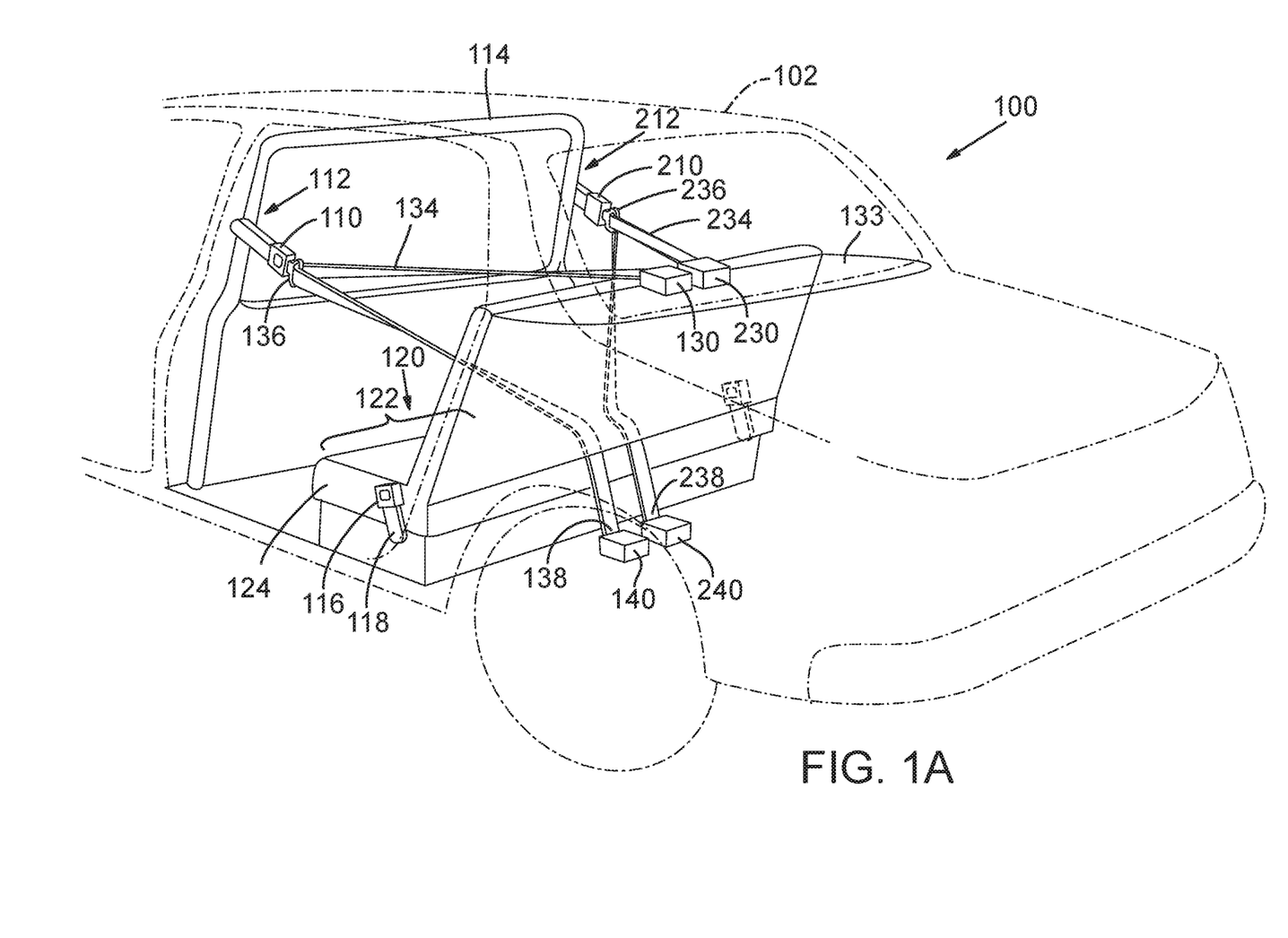
FIG. 1A is a perspective view of an implementation of the two-buckle seat belt mode changing system as installed for use in a rear seat of a vehicle.

Referring to FIG. 1A, a system 100 is shown implemented for a vehicle 102, and in particular, for a rear of the vehicle 102. The system 100 permits a passenger, such as, e.g., a detainee or a prisoner, to be secured in a seat space 122 of a rear seat 120 with a seat belt 134, typically while the detainee is handcuffed with his hands behind his back. The following first describes operation of the system for the seat space 122, which is illustrated for a left side of the vehicle 102. (with the detainee omitted for ease of illustration), but operation for a right side seat space is similar. Of course, in other implementations, there may be fewer than two or more than two seat spaces in the rear seat 120.

The system 100 has a seat belt retractor 130 that is configured to change operating modes automatically based on, e.g., whether the seat belt is buckled or unbuckled. More specifically, the system 100 has multiple buckle locations for the single seat space 122, such as a first seat belt buckle 110 at a first location 112 and a second seat belt buckle 116 at a second location 118. Having the seat belt 134 configured for coupling to different locations in sequence provides a number of benefits. An officer or other vehicle operator who needs to guide a handcuffed detainee into a seated position in the seat space and secure the seat belt around the detainee for transport can do so more easily and with less risk of injury, because there is no need to reach across the detainee.

The seat belt 134 has a tongue 136 that is configured to be selectively positionable along the seat belt 134, such as by sliding, and is insertible into a seat belt buckle, such as the first seat belt buckle 110 or the second seat belt buckle 116. An end 138 of the seat belt 134 is connected to a fixed end mount 140, which can be positioned as shown adjacent a floor 137 of the vehicle, or at another suitable location, typically rearward of the seat back.

The first location 112 is forward and above the seat 120. In some implementations, the first seat belt buckle 110 can be connected to a partition 114, which eliminates the need to separately modify the vehicle for mounting the first seat belt buckle 110, such as to one of the vehicle's pillars or another vehicle location, although such other locations can be used if desired.

The retractor 130 can be positioned at a third location 132, e.g., on a rear deck 133 as shown, or at another suitable location. The third location is typically rearward of the seat back and elevated above the level of the seat. In in the illustrated implementation, the rear seat 120 extends laterally in a direction transverse to a longitudinal axis of the vehicle. Thus, the second location 118 for the second seat belt buckle 116 and the third location 132 for the retractor 130 are laterally spaced from each other along the seat, although they need not be aligned at the same level or at the same the longitudinal position. The second location 118 can be described as being adjacent a near side 124 of the seat space 122, and the third location 132 can be described as being adjacent a far side of the seat space 122. Because the third location is more centrally located, a seat belt retractor mounted in this location is sometimes referred to as a "center pull" mounted seat belt. In some implementations, the positions of the retractor 130 and the fixed end mount 140 can be reversed.

In FIG. 1A, the seat belt 134 has been extended from an idle position (where the webbing extends a shorter distance separating the retractor 130 and the end mount 140) to a first operating position, sometimes referred to as the parked or docked position, with the tongue 136 inserted into the first seat belt buckle 110. The parked or docked position encompasses a working length that is typically but no always the greatest working length of seat belt extended from the retractor 130 during normal operation.

Figure 1B:
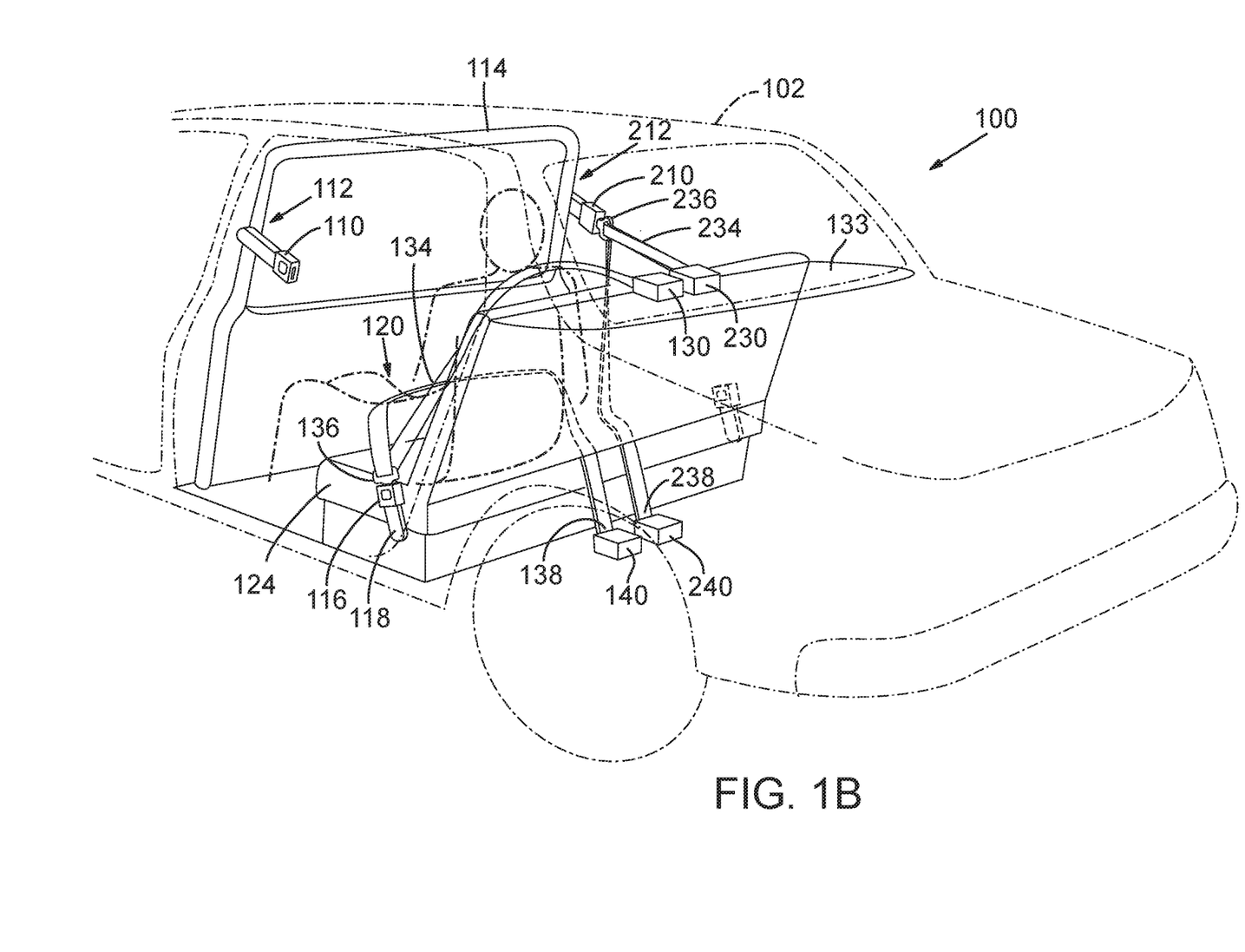
FIG. 1B is a perspective view of the system similar to FIG. 1A, but showing a detainee seated and secured by the seat belt.

In FIG. 1B, a detainee has been seated in the seat space 120 while the seat belt is suspended as shown in FIG. 1A, and the tongue 136 has been released from the first seat belt buckle 110, wrapped around the detainee and inserted into the second seat belt buckle 116 while the retractor 130 rewinds any excess webbing.

Figure 4:
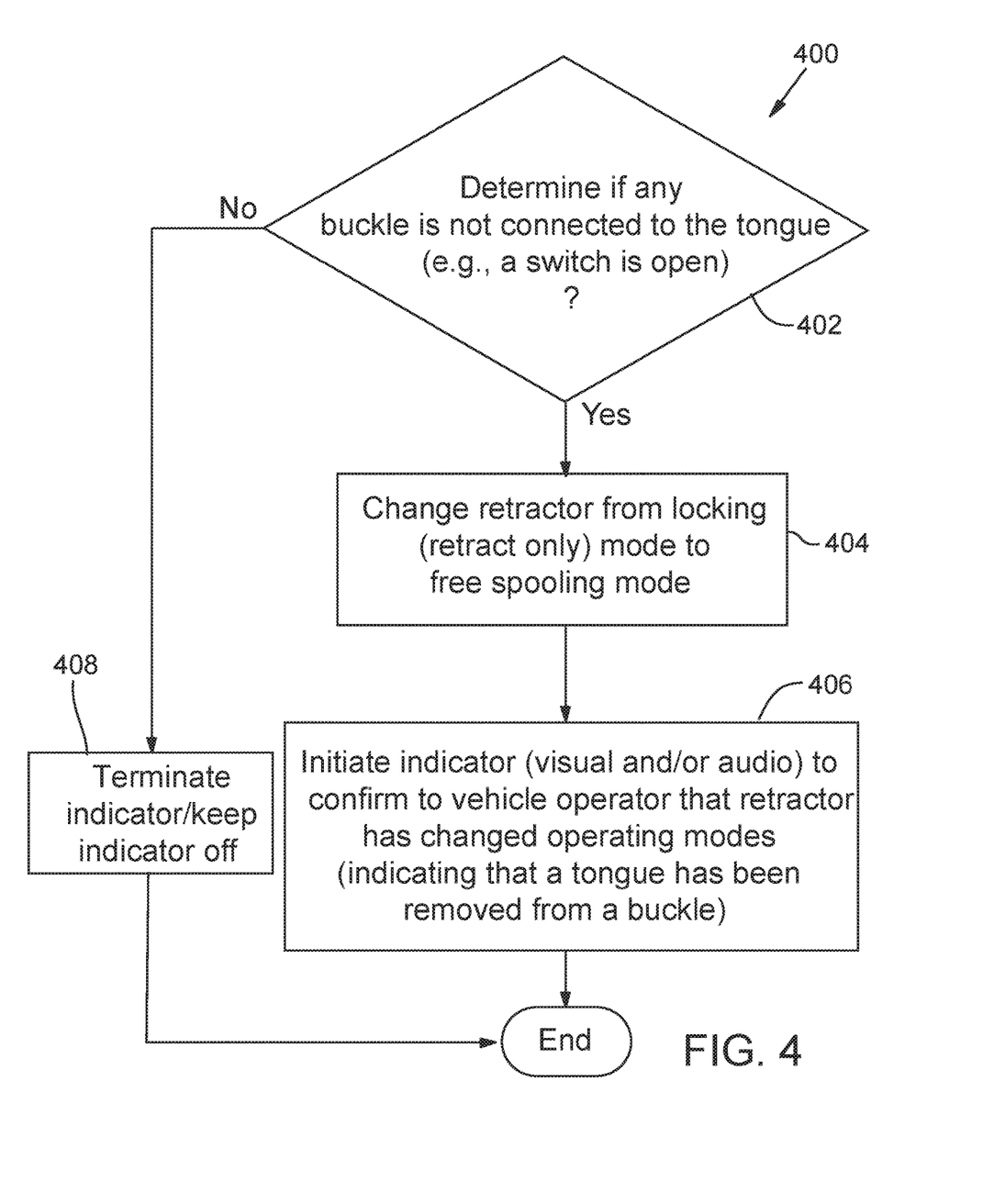
FIG. 4 is a flow chart showing steps in an operation method for the system.
Figure 5:
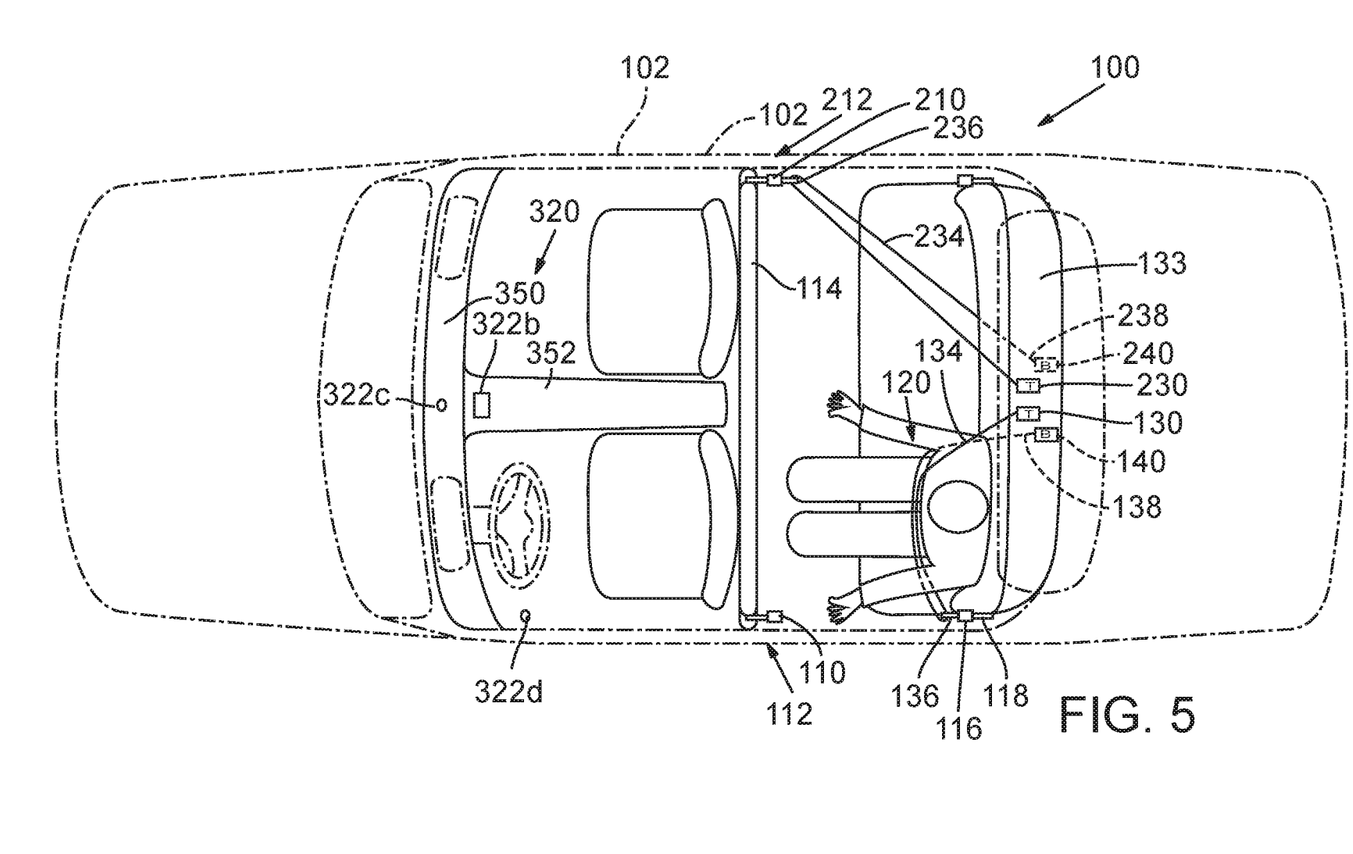
FIG. 5 is a top plan view of a vehicle showing relative locations of components of the system.

A second system for the right seat space includes the first seat belt buckle 210 at a first location 212, the second seat belt buckle 216 (FIG. 4), the retractor 230, the seat belt 234 and the tongue 236, which is shown inserted in the first seat belt buckle 210 in FIGS. 1A, 1B and 4. The systems for the left side seat space and the right side seat space may be configured to operate independently, but the indicator can be configured to work for both systems together or to differentiate between the two systems as is described in further detail elsewhere.

Figure 2:
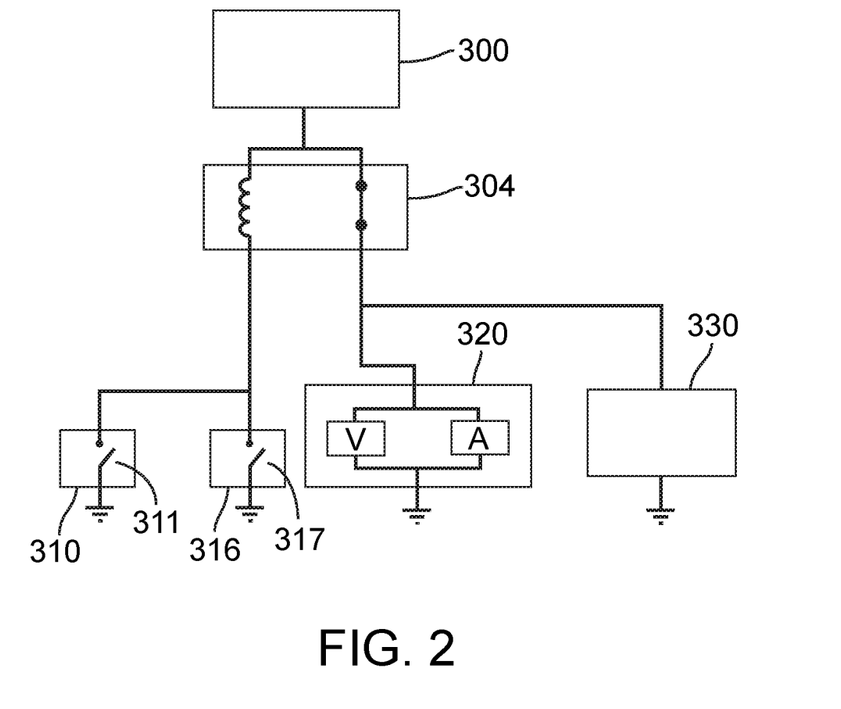
FIG. 2 is a schematic circuit diagram of the seat belt mode changing system.

FIG. 2 is a schematic diagram of an electrical circuit for use with two seat belt buckles and a retractor according to one implementation. The circuit has a source of power, such as vehicle battery 300 (typically rated at 12 volts or higher, but other sizes of batteries may also be used). An electrically-actuated mode-changing seat belt retractor 330, and in particular, a solenoid for the retractor, receives power via a relay 304. In the illustrated implementation, the relay 304 is a normally closed relay rated for 30 Amps. A first seat belt buckle 310 is linked to the relay 304 via a first buckle switch 311. Separately, a second seat belt buckle 316 is linked to the relay 304 via a second buckle switch 317 connected in parallel with the first buckle switch 311. In the illustrated implementation, the first buckle switch 311 and the second buckle switch 317 are each configured as normally open switches that change state from closed to open when "unbuckled," i.e., when a tongue is removed from the respective seat belt buckle. Therefore, when a tongue is removed from the first seat belt buckle 310 (or from the second seat belt buckle 316), the relay 304 is de-energized, causing it to change from an open state to a closed state, thereby energizing the retractor 330 and causing the solenoid to change the operating mode of the retractor.

In the illustrated implementation, the retractor 330 is configured to be in a "locking" or "retract only" mode when power is supplied to the relay 304, which keeps the seat belt from being extended from the retractor 330 (but the retractor still functions to retract excess webbing when tension on the seat belt is released). Thus, there is no need to further manipulate the seat belt, such as by withdrawing more webbing and releasing it, to trigger the locking mode. Rather, locking mode is triggered upon the tongue being received in the buckle.

When power to the solenoid is cut off, such as when the switch 311 or the switch 317 is closed, then the retractor changes from a "free spooling" (or "extend and retract") mode to a locking mode. Configuring the retractor 330 in this way has certain benefits, as the retractor will be in the locking mode if the battery 300 dies or there is another interruption (e.g., as the result of an accident) in the supply of power to the retractor.

As also shown in FIG. 2, there is an electrically actuated indicator 320 connected to the relay 304 and in parallel with the retractor 330. The indicator 320 is configured to trigger an indication, such as a visual and/or audio indication. The indication is directed to at least the driver or other operator of the vehicle. The indicator 320 preferably includes one or more lights (or other visual indicators, including, e.g., displays, display elements, etc.) and/or one or more audio devices (e.g., bells, chimes, buzzers, etc.). The indicator 320 may be dedicated to the retractor 330, or other existing systems of the vehicle may be reconfigured to fulfill the indicator functions. In one specific implementation, the indicator 320 causes one or more lights (e.g., one or more LEDs) to be lit on or around the dashboard area 350, on a console 352 between the front seats, or in another area within view of the vehicle's driver. The light is lit when a tongue is released from a seat belt buckle that is configured as part of the system. The light is extinguished when one of the two or more seat belt buckles has received the tongue. Representative light locations include one or more of the following: on or near the dashboard 322a, on or near a center console 322b, on or near the rearview mirror/windshield 322c, and/or on or near the driver's door 322d, as some examples. In this way, an important message is quickly and straightforwardly communicated to the driver: the seat belt around the detainee in the rear seat has been released from one of the seat belt buckles, which may require the driver's immediate attention.

Figure 3:
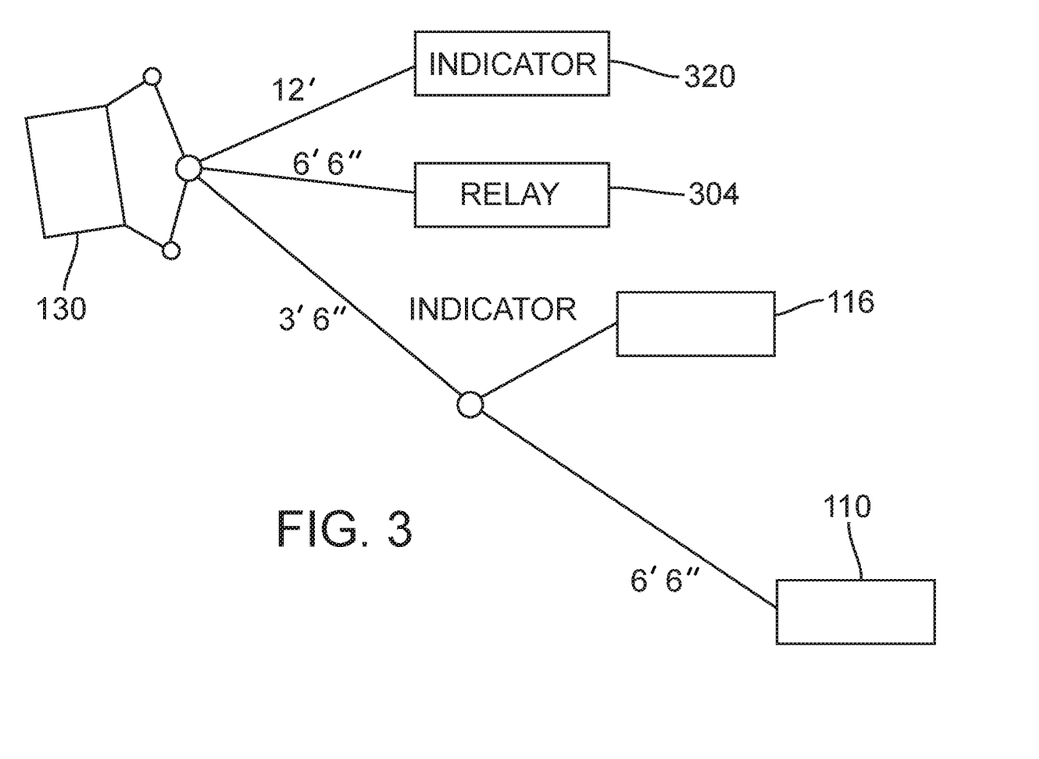
FIG. 3 is a schematic diagram showing the wiring and components of the system.

FIG. 3 is a wiring diagram of an exemplary wiring harness and the components of the system as configured for a retrofit installation into a vehicle. At the left side of the figure, a schematic depiction of the retractor 130 is shown, with small circles indicating splices between the new wiring and existing wiring. The relay 304 is connected to the same node as the retractor 130 via a 6.5 ft. wire or cable. The indicator 320 is connected to the same node as the retractor and relay by a 12 ft. wire or cable. The second buckle switch (in the second seat belt buckle 116) is connected via a 3.5 ft wire or cable to the same node. The first buckle switch (in the first buckle 110) is connected to the second buckle wiring via 6.5 ft wire or cable. Thus, it is straightforward to add the system to an existing vehicle by interfacing FIG. 4 is a flow chart of operations that take place in the system. The following description proceeds according to the system as configured for a single seat space. In step 402, it is determined if a buckle has been disconnected (precisely speaking, it is determined if a tongue has been removed from a buckle). If so, then in step 404, the retractor is changed from locking mode to free spooling mode (based on the open buckle switch de-energizing the relay to close, thus energizing the retractor). Optionally, in step 406, an indicator can be initiated to inform the vehicle operator the retractor has changed modes and indicating that a tongue has been released from a buckle).

If the answer in step 402 is "No," and a buckle has not been disconnected, i.e., if a tongue remains inserted in at least one of the buckles of the system, then in step 408 the indicator is extinguished or kept off.

If desired, the system can include a switch or other means by which the seat belt system can be turned off when not needed, such as if regular passengers are being transported in the rear seat. Alternatively, the system can be configured as shown to operate at all times while installed, like other safety equipment, which ensures that the system is not inadvertently turned off when needed.

In view of the many possible embodiments to which the disclosed principles may be applied, it should be recognized that the illustrated embodiments are only preferred examples and should not be taken as limiting the scope of protection. Rather, the scope of protection is defined by the following claims. We therefore claim all that comes within the scope and spirit of these claims.

We claim:

1. A seat belt system for a vehicle, comprising:
   a first seat belt buckle mounted at a first location;
   a second seat belt buckle mounted at a second location;
   a seat belt retractor mounted at a third location, the third location being spaced along a seat for an occupant from the second location;
   a seat belt extendable from the retractor and having a tongue, wherein the seat belt is extendable to connect the tongue to the first seat belt buckle or the second seat belt buckle;
   a circuit interconnecting the first seat belt buckle, the second seat belt buckle and the seat belt retractor, wherein the circuit comprises a relay connected to the first seat belt buckle and to the second seat belt buckle, a first switch connected to the first seat belt buckle and a second switch connected to the second seat belt buckle, wherein the first switch and the second switch are connected to the relay in parallel to each other, wherein the relay is configured to change an operating mode of the seat belt retractor when at least one of (1) the seat belt tongue is removed from the first seat belt buckle and the first switch changes states, or (2) the seat belt tongue is removed from the second seat belt buckle and the second switch changes states.

2. The seat belt system of claim 1, wherein the tongue defines an end of the seat belt.

3. The seat belt system of claim 1, wherein the first switch and the second switch are configured to be in an open state when the tongue is removed from the first seat belt buckle or the second seat belt buckle, respectively, thereby de-energizing the relay and causing a solenoid in the seat belt retractor to be energized and change the seat belt retractor to a free-spooling mode.

4. The seat belt system of claim 1, wherein the relay comprises a normally closed relay.

5. The seat belt system of claim 4, wherein the first switch or the second switch is configured to be in a closed state when the tongue is inserted in the first seat belt buckle or the second seat belt buckle, respectively, thereby energizing the relay and causing power to a solenoid in the seat belt retractor to be terminated and the seat belt retractor to change to a locking mode.

6. The seat belt system of claim 1, wherein the circuit comprises an indicator operable to signal a vehicle operator if at least one of (1) the seat belt tongue is removed from the first seat belt buckle or (2) the seat belt tongue is removed from the second seat belt buckle.

7. The seat belt system of claim 6, wherein the indicator comprises a visual indicator.

8. The seat belt system of claim 6, wherein the indicator comprises an audio indicator.

9. The seat belt system of claim 1, further comprising at least one illumination element connected to the relay, wherein the at least one illumination element is configured to be illuminated when the relay is deenergized by opening the first switch or opening the second switch.

10. The seat belt system of claim 9, wherein the at least one illumination element is one or more LED elements.

11. The seat belt system of claim 1, wherein the seat for the occupant is a passenger seat, and wherein the first seat belt buckle is configured for positioning at a level above and spaced forwardly of the passenger seat, the second seat belt buckle is configured for positioning adjacent a first side of the passenger seat and the seat belt retractor is configured for positioning at a level above the seat and rearward of the seat.

12. The seat belt system of claim 11, wherein the first seat buckle is connected to a partition positioned to separate a rear seat area from a front seat area in the vehicle, and wherein the passenger seat comprises a rear passenger seat space of a rear seat.

13. The seat belt system of claim 12, wherein the second seat belt buckle is positioned adjacent an outer side of the rear passenger seat space and the seat belt retractor is positioned at an inner side of the rear passenger seat space.

14. The seat belt system of claim 1, wherein the first switch changes states upon removing the tongue from the first seat belt buckle, thereby electrically triggering the seat belt retractor to change from a locking mode to a free spooling mode to allow the seat belt to be extended from the seat belt retractor as the tongue is repositioned from the first seat belt buckle to the second seat belt buckle.

15. The seat belt system of claim 14, wherein the second switch changes states when the tongue is inserted into the second buckle, thereby electrically triggering the seat belt retractor to change from the free spooling mode to the locking mode to prevent the seat belt from being further extended from the seat belt retractor.

16. The seat belt system of claim 15, wherein the second switch changes states when the tongue is removed from the second buckle, thereby electrically triggering the seat belt retractor to change from the locking mode to the free spooling mode.

* * * * *